United States Patent
Halt et al.

(10) Patent No.: US 6,385,533 B1
(45) Date of Patent: May 7, 2002

(54) METHOD AND SYSTEM USING DYNAMIC PROFILING IN A MOBILE ENVIRONMENT FOR COLLECTING DATA FOR A GEOGRAPHIC DATABASE

(75) Inventors: Gene Halt, Chicago; Kevin Cherveny, Wilmington, both of IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/753,871

(22) Filed: Jan. 3, 2001

(51) Int. Cl.[7] ............................ G01S 5/14; G01C 21/30; H04Q 7/20; B60K 31/00
(52) U.S. Cl. ...................... 701/207; 701/205; 701/208; 701/200; 340/905; 73/178 R
(58) Field of Search ................................ 701/207, 205, 701/208, 209, 200; 73/178 R; 340/905

(56) References Cited

U.S. PATENT DOCUMENTS

| | | | |
|---|---|---|---|
| 4,994,971 A | | 2/1991 | Poelstra |
| 5,159,556 A | * | 10/1992 | Schorter .................. 701/210 |
| 5,170,164 A | | 12/1992 | Lewis |
| 5,214,757 A | | 5/1993 | Mauney et al. |
| 5,377,102 A | | 12/1994 | Nishiishigaki |
| 5,528,518 A | | 6/1996 | Bradshaw et al. |
| 5,563,607 A | | 10/1996 | Loomis et al. |
| 5,633,946 A | | 5/1997 | Lachinski et al. |
| 5,684,696 A | * | 11/1997 | Rao et al. .................. 701/25 |
| 5,959,580 A | * | 9/1999 | Maloney et al. ........... 342/457 |
| 5,968,109 A | * | 10/1999 | Israni et al. ............... 701/208 |
| 6,122,593 A | * | 9/2000 | Friederich et al. ........ 701/202 |
| 6,169,995 B1 | | 1/2001 | Yoshimura et al. |
| 6,175,803 B1 | * | 1/2001 | Chowanic et al. |
| 6,288,675 B1 | * | 9/2001 | Maloney ................... 342/457 |

* cited by examiner

Primary Examiner—William A. Cuchlinski, Jr.
Assistant Examiner—Olga Hernandez
(74) Attorney, Agent, or Firm—Frank J. Kozak; Lawrence M. Kaplan (57) ABSTRACT

A feature provided by a data collection system that can be used by a database researcher is disclosed. As the database researcher travels through a geographic area and observes geographic features (such as roads), the database researcher uses the data collection system to collect and store data that represent attributes of the geographic features. The data collection system includes a feature whereby the database researcher can define a profile of one or more attributes of one or more geographic features. The profile is stored in a memory of the data collection system. Then, as the database researcher travels through the geographic area and new geographic features are encountered, the data collection system automatically applies these attributes to each new geographic feature, thereby eliminating the need on the part of the database researcher to separately specify each attribute of a newly encountered geographic feature. If the database researcher determines that the attributes in the stored profile are not appropriate for a geographic feature, the database researcher can override the profile attributes and store the appropriate attributes.

21 Claims, 8 Drawing Sheets

INPUT DATA FOR ROAD SEGMENT RECORD

NAME =
HWY =
CONDITIONS =
SPEED CATEGORY = 4
FUNCTIONAL CLASS = 2
LANE CATEGORY = 1
PAVED? = 1
MULTI-DIGITIZED = 0

NODE L
LAT =
LONG =

NODE R
LAT =
LONG =

ADD L = 4301;4399
ADD R = 4300;4398

METHOD AND SYSTEM USING DYNAMIC PROFILING IN A MOBILE ENVIRONMENT FOR COLLECTING DATA FOR A GEOGRAPHIC DATABASE

BACKGROUND OF THE INVENTION

The present invention relates to collecting data for a geographic database and more particularly, the present invention relates to a feature of a data collection system that enables a researcher, who travels through a geographic area collecting data to define a profile of one or more attributes of one or more geographic features and then have these attributes automatically applied to a database record that represents each new geographic feature as it is encountered, thereby eliminating the need on the part of the researcher to separately specify each attribute.

Geographic databases have various uses. For example, geographic databases are used in in-vehicle navigation systems, personal computers, networked computing environments, and various other kinds of platforms, as well as on the Internet. Geographic databases are used with various kinds of applications to provide various functions, including map display, route calculation, route guidance, truck fleet deployment, traffic control, electronic yellow pages, emergency services, and so on.

In order to provide these kinds of functions, a geographic database includes data that represent geographic features in a covered geographic region. Geographic databases include details about represented geographic features, such as the geographic coordinates of roads in a geographic region, speed limits along the road segments, locations of stop lights, turn restrictions at intersections of roads, address ranges, street names, and so on. Geographic databases may also include information about points of interest in covered regions. Points of interest may include restaurants, hotels, airports, gas stations, stadiums, police stations, and so on.

Collecting information for a geographic database is a significant task. Not only is the initial collection of data a significant undertaking, but a geographic database needs to be updated on a regular basis. For example, new streets are constructed, street names change, traffic lights are installed, turn restrictions are added to existing roads, and so on. Also, new levels of detail may be added about geographic features that are already represented in an existing geographic database. For example, an existing geographic database for roads may be enhanced with information about lane widths, shoulder sizes, lane barriers, address ranges, sidewalks, bicycles paths, etc. Thus, there exists a need to continue to collect information for a geographic database.

According to one method, technicians (referred to herein as "researchers" or "users") are assigned the task of collecting data for a geographic database. Each researcher may physically travel throughout an assigned area and record information about observed geographic features. While in the field, the researcher may record the observed information by physically writing on a printed copy of a map. For example, the researcher may write a description about an attribute of a geographic feature adjacent to the representation of the geographic feature on the map. After the data are collected in the field, the researcher uses a computer program to enter data to a main copy of the geographic database. Working from the marked-up printed copy of the map, the researcher makes additions and/or changes to the data in the geographic database to reflect the actual geographic features observed while out in the field.

Although this process works well, there is room for improvement. For example, writing descriptions of geographic features onto a printed copy of a map can be time-consuming. Also, it can be difficult to write information legibly while traveling in a moving vehicle.

Computerized data collection techniques for acquiring certain types of geographic data are known. Several methods and systems for collecting geographic data are disclosed in Ser. Nos. 09/256,389, 09/335,122, 09/426,036, 09/426,341 and 09/691,308 the entire disclosures of which are incorporated by reference herein.

Although the computerized data collection systems disclosed in these copending patent applications facilitate collection of geographic data, there continues to be room for improvement. As navigation systems and other vehicle systems that use geographic data (such as advanced safety systems like adaptive cruise control and obstacle avoidance) become more sophisticated, there is a need to collect more geographic data as well as different types of data. The amount of data being collected by a technician can become burdensome even with computerized data collection systems.

Accordingly, it is desired to provide an improved method and system for collecting data for a geographic database.

SUMMARY OF THE INVENTION

To address these and other objectives, the present invention comprises a feature provided by a data collection system that can be used by a database researcher. As the database researcher travels through a geographic area and observes geographic features (such as roads), the database researcher uses the data collection system to collect and store data that represent attributes of the geographic features.

The data collection system includes a dynamic profiling feature. The dynamic profiling feature derives from a recognition that road attributes tend to be location-consistent. Using the dynamic profiling feature of the data collection system, the database researcher defines a profile of one or more attributes of one or more geographic features. The profile is stored in a memory of the data collection system. Then, as the database researcher travels through the geographic area and new geographic features are encountered, the data collection system automatically applies these attributes to each new geographic feature, thereby eliminating the need on the part of the database researcher to separately specify each attribute of a newly encountered geographic feature. If the database researcher determines that the attributes in the stored profile are not appropriate for a geographic feature, the database researcher can override the profile attributes and store the appropriate attributes.

DETAILED DESCRIPTION OF THE PRESENTLY PREFERRED EMBODIMENTS

I. OVERVIEW

Figure 1:
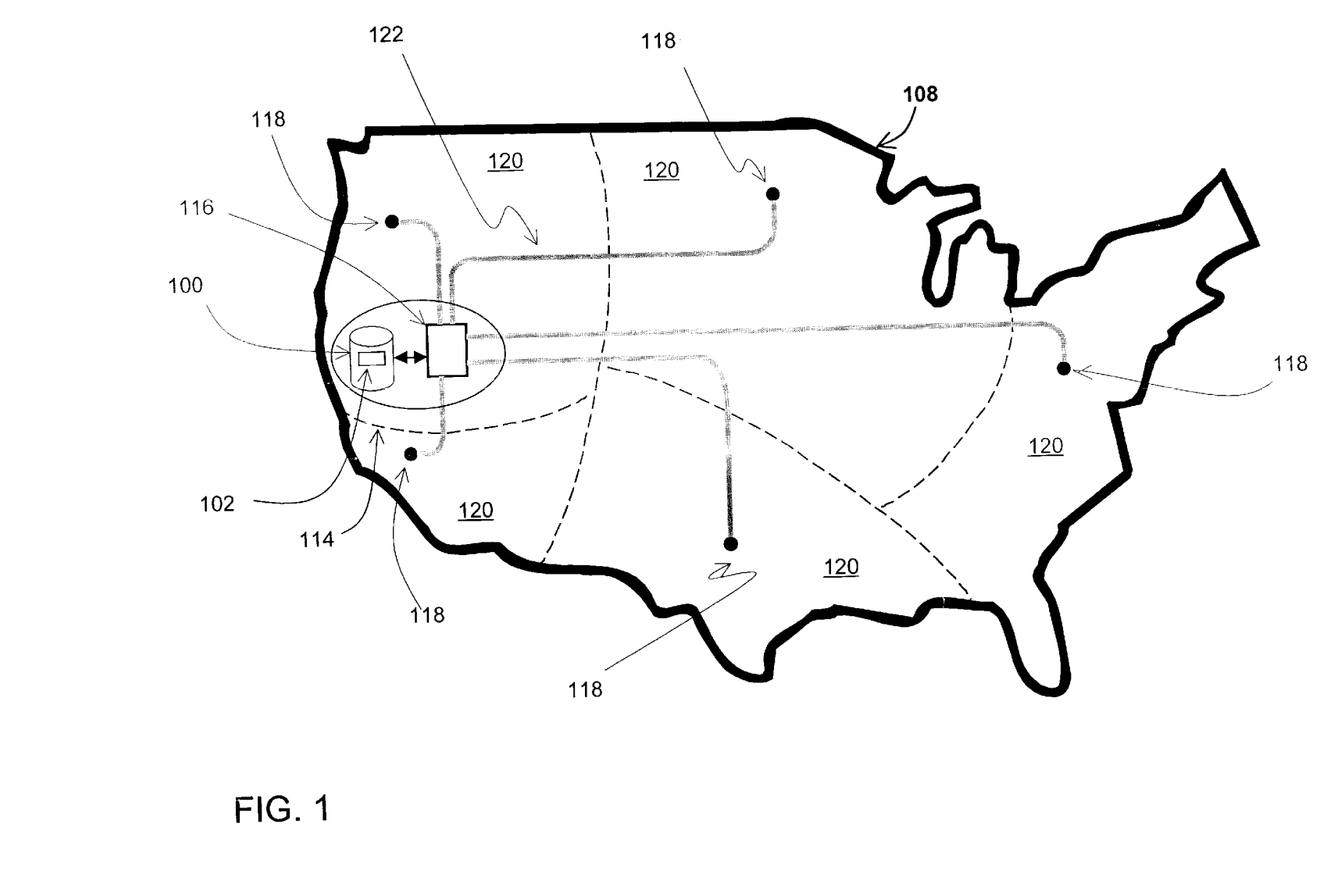
FIG. 1 is a diagram illustrating a coverage area in which an embodiment of the present invention for collecting data for a geographic database can be used.

A first embodiment is described with reference to FIGS. 1 through 8. FIG. 1 shows a primary version of a geographic database 100. The primary version of the geographic database 100 includes data 102 that represent geographic features in a coverage area 108. The coverage area 108 may correspond to an entire country, such as the United States. Alternatively, the primary version of the geographic database 100 may correspond to several countries, such as the United States, Canada, and Mexico, or France, Germany, and Italy, and so on. According to another alternative, the primary version 100 may represent only a single region within a country, such as the West Coast or the Midwest of the U.S. The primary version of the geographic database 100 is maintained as the copy that has the most up-to-date data relating to the coverage area 108. Various processes may be used to confirm the integrity of the data in the primary version 100. Although the geographic database 100 includes data that represent geographic features in the entire coverage area 108, there may be parts of the coverage area 108 that contain geographic features that are not represented by data in the geographic database, or for which the coverage is sparse.

As stated above, the data 102 in the primary version of the geographic database 100 represents geographic features in the covered area 108. The data 102 includes various attributes of the represented geographic features. For example, the primary version of the geographic database 100 includes data that represent roads including data that represent attributes of roads, such as the geographic coordinates of positions on the roads, street names of the roads, addresses ranges along the roads, turn restrictions at intersections of roads, and so on. The geographic data 102 may also include information about points of interest in the covered geographic area 108. Points of interest may include hotels, restaurants, museums, stadiums, offices, automobile dealerships, auto repair shops, etc. The geographic data 102 may include data about the locations of these points of interests. The geographic data 102 may also include information about places, such as cities, towns, or other communities. The geographic data 102 may include other kinds of information.

The primary version of the geographic database 100 is updated, expanded, and/or otherwise modified on a regular and continuing basis. To facilitate these operations, the primary version of the geographic database 100 is preferably maintained in a format that facilitates updating and development. For example, the data in the primary version 100 may be stored in an uncompressed format. An example of a suitable format is the VSAM format, although other kinds of formats, both proprietary and non-proprietary, may be suitable.

A copy of the primary version 100 of the geographic database is physically located at a first location 114. In one embodiment, the primary version of the geographic database 100 is stored on one or more hard drives and accessed with a mainframe computer 116, such as an Amdahl or IBM mainframe computer. One or more backup copies are also maintained.

In one embodiment, the geographic data 102 are maintained and developed by Navigation Technologies Corporation of Rosemont, Ill. However, it is understood that the inventive concepts disclosed herein are not limited to any particular source of data.

Figure 2:
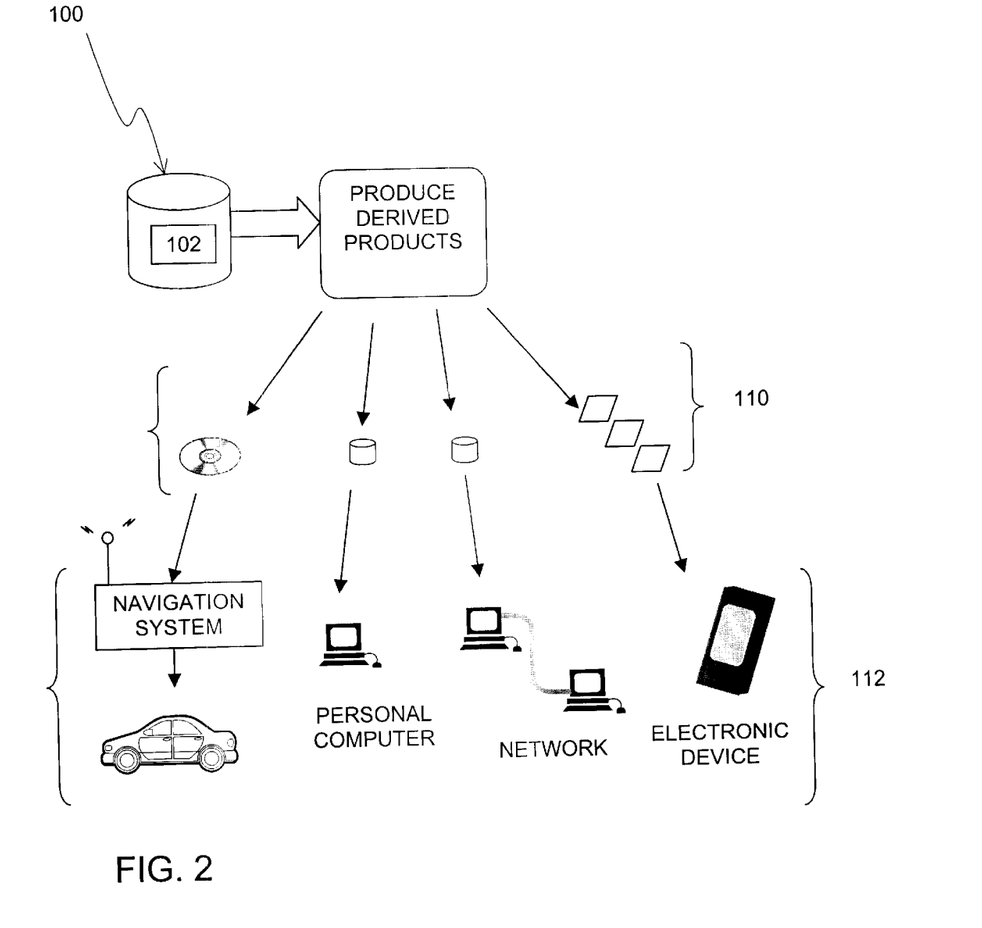
FIG. 2 is a diagram illustrating a process for forming derived database products from the primary version of the geographic database shown in FIG. 1.

As illustrated in FIG. 2, the primary version of the geographic database 100 is used to make derived database products 110. The derived database products 110 made from the primary version 100 may include only portions of all the data in the primary version 100. For example, the derived database products 110 may include data that relate to only one or more specific regions located within the coverage area 108 of the primary version 100.

The derived database products 110 are used by various applications. For example, the derived database products 110 may be used by applications that provide various functions, such as route calculation, route guidance, vehicle positioning, map display, and electronic yellow pages, as well as other kinds of functions. The derived database products 110 may be used on various kinds of computing platforms 112. For example, the derived database products 110 may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, and so on). Derived database products 110 may also be used on networked computing platforms and environments, including the Internet.

The derived database products 110 made from the primary version may be in a different format than the format in which the main copy of the database 100 is maintained. The derived database products 110 may be in a format that facilitates the uses of the derived products in the platforms in which they are installed. The derived database products 110 may also be stored in a compressed format on the media on which they are located.

The derived database products 110 may be stored on media that are suitable for the hardware platforms in which they area installed. For example, the derived database products 110 may be stored on CD-ROM disks, hard drives, DVD disks, flash memory, or other types of media that are available now or that become available in the future.

As mentioned previously, the primary version of the geographic database 100 includes the most up-to-date data relating to the coverage area 108. Processes are used to update, check, and expand the coverage of the data 102 in the primary version of the geographic database 100 on a regular basis. Expanding the coverage of the database includes adding data records to represent geographic features that had not already been represented by records in the geographic database. For example, within a coverage area (such as the area 108 in FIG. 1), there may be sub-areas that are not represented. Expanding the coverage of the database also includes adding data for new developments, e.g., new subdivisions. Expanding the coverage may also include adding more detail for areas that are already represented. In addition to expanding the coverage of the geographic database, there is a continuous need to update and check the existing data in the database. For example, speed limits may change, turn restrictions may change, etc.

Referring again to FIG. 1, the processes of updating, checking and expanding are performed by staff at one or more field offices 118. The field offices 118 are located in the geographic area corresponding to the coverage area 108 of the primary version of the geographic database. Each field office 118 may be associated with a separate portion 120 of the entire coverage area 108. Each field office 118 includes the appropriate hardware and software so that data can be exchanged between computing equipment located at the field office and the main computer 116. In one embodiment, the field offices 118 and the main computer 116 are connected with a data network 122. The network 122 may be a wide area network (WAN), the Internet, or any other kind of technology that enables the exchange of data between the main computer 116 and the field offices 118.

Each of the field offices 118 is staffed with one or more technicians (referred to herein as "researchers"). The researchers perform several functions. The researchers collect data for the primary database 100. The researchers may add data about geographic features that had not previously been included in the primary database 100. The researchers may also check data about geographic features that are already represented in the primary database 100 to assure that the data are correct and up-to-date.

Figure 3:
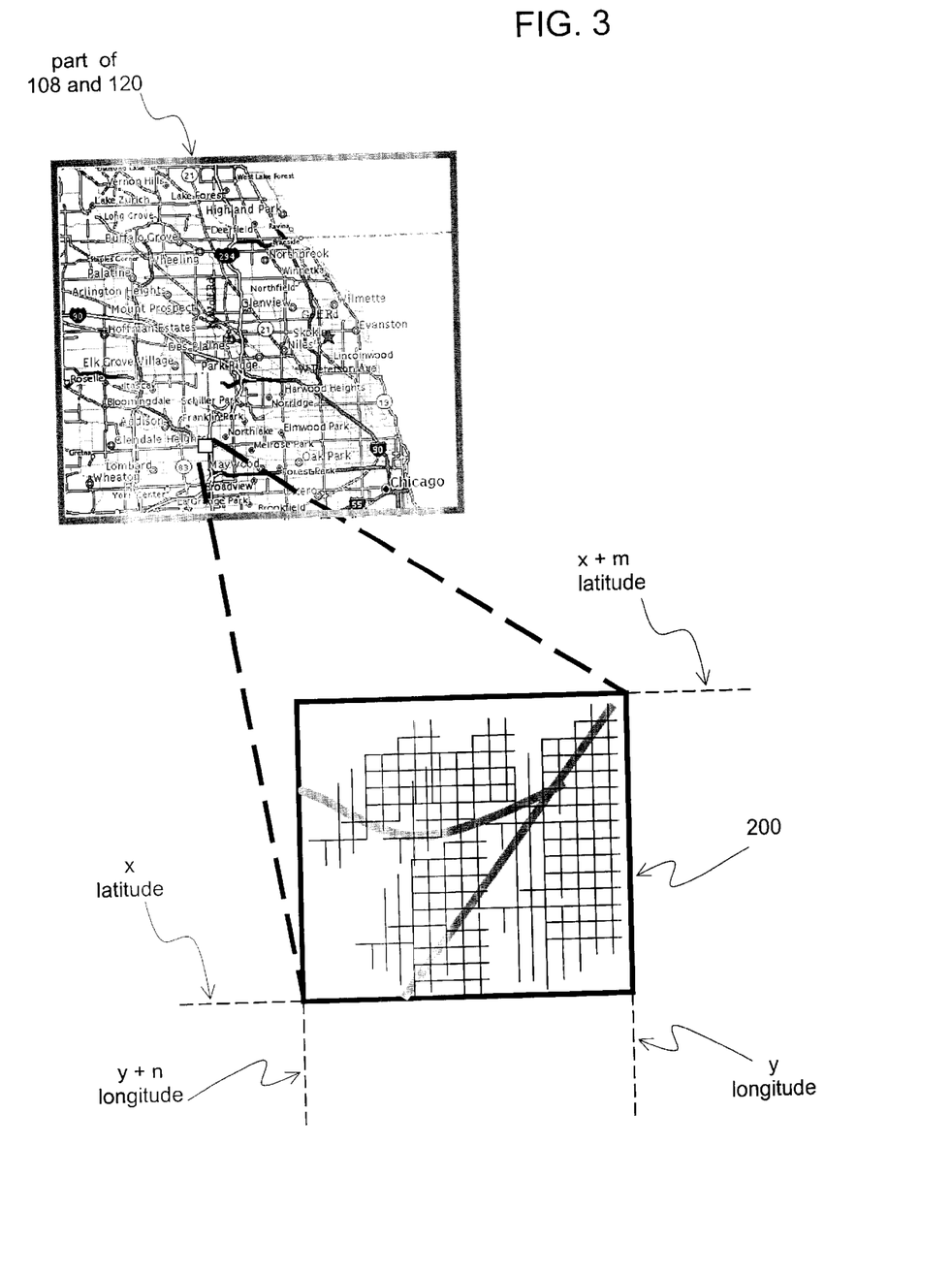
FIG. 3 is a map illustrating an assignment area which is located in the coverage area shown in FIG. 1 and which contains geographic features about which data will be collected for the primary version of the geographic database.

The data collection activities of a researcher are organized into assignments. Referring to FIG. 3, each assignment is associated with an assignment area 200. The area 200 is a physical geographic area that contains geographic features about which the researcher collects data for updating or expanding the primary version of the geographic database 100. The assignment area 200 is typically a relatively small portion of the coverage area 108. The assignment area 200 may be within the part 120 of the coverage area assigned to the field office.

The size of the assignment area 200 may depend upon various factors, such as the kinds of data being collected, the distance of the assignment area from the field office, the density of geographic features in the assignment area, and so on. For example, the assignment area 200 may be several square miles, or alternatively, the assignment area 200 may be hundreds of square miles.

Although data about some types of geographic features can be collected without leaving the location of the field office (using aerial photographs, for example), collection of data for other types of geographic features (or attributes thereof) may require that the researcher physically observe the geographic feature. Thus, a researcher may have to travel to the assignment area and drive along roads in the assignment area by car (or other suitable mode of transportation) to collect some types of data. Travel by a researcher to an assignment area is relatively expensive and time-consuming. Accordingly, when a researcher travels to an assignment area to collect geographic data, there is a need to operate efficiently.

II. THE DATA COLLECTION SYSTEM

Figure 4:
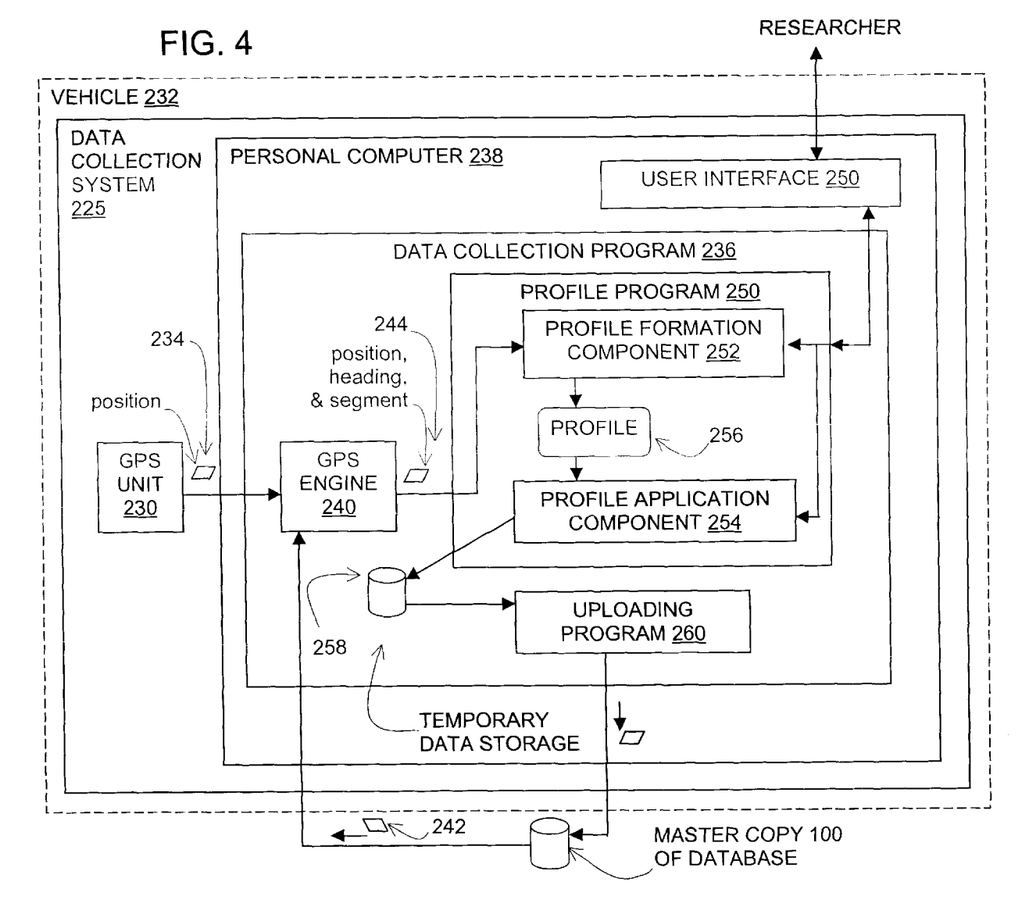
FIG. 4 is a block diagram showing components of a first embodiment of a system for collecting data for the geographic database shown in FIG. 1.

FIG. 4 shows a block diagram of an embodiment of a data collection system 225. The data collection system 225 is installed or located in a vehicle 232 in which the researcher travels along roads in a geographic area observing geographic features.

The data collection system 225 is a tool that facilitates the collection of information about geographic features, such as roads. In particular, the data collection system 225 facilitates the collection of those kinds of information which are preferably obtained by direct observation by a researcher.

The data collection system 225 may be used to obtain the following kinds of information about roads:

1. address ranges along roads,
2. whether a lane divider is present,
3. lane category (e.g., number of lanes), or alternatively, exact number of lanes (e.g., 1, 2, 4, etc.),
4. functional class (e.g., "4" corresponds to expressways and "1" corresponds to side streets),
5. speed category (e.g., 10 m.p.h. or less corresponds to "1", 11–25 m.p.h. corresponds to "2", etc.) or alternatively, absolute speed limit (e.g., 10 m.p.h., 30 m.p.h., etc.),
6. whether a road is paved,
7. whether a road is multi-digitized (i.e., whether the geometry of the lanes in one direction are separately represented from the geometry of the lanes in the other direction),
8. points of interest (gas stations, hotels, automatic teller machines, stadiums, police stations, etc.) along the roads,
9. conditions (e.g., no parking, no turns between 4:00 P.M. and 6:00 P.M., etc.),
10. signs (e.g., "EXIT I-290 RIGHT LANE"), and
11. name(s) of road.

These are some of the kinds of information that a researcher can collect about segments of roads using the data collection system 225. The researcher may not necessarily collect all these kinds of information about each road segment. Alternatively, the researcher may collect additional kinds of information about some road segments.

The data collection system 225 includes hardware and software components. The data collection system 225 includes a GPS unit 230. The GPS unit 230 determines its position and hence the position of the vehicle 232 in which the GPS unit 230 is located. The GPS unit 230 updates this determination on a regular (or irregular) basis. The GPS unit 230 provides an output 234 in the form of a series of data indicating the instantaneous position of the vehicle determined over time. For example, the GPS unit 230 may determine the position of the vehicle 232 every second. Alternatively, the GPS unit 230 may determine the position of the vehicle 232 less frequently, e.g., every 2 seconds, every 5 seconds, etc., or more frequently, such as every 0.5 seconds or every 0.1 seconds, or even more frequently. The position of the vehicle may be defined by geographic coordinates, i.e., latitude and longitude, and optionally altitude. The GPS unit 230 may be implemented using a suitable GPS receiver, such as systems that are commercially available from Garmin, Trimble, Satloc, and Ashtech.

The GPS unit 230 may be part of the data collection system 225 or alternatively, the GPS unit 230 may a standalone unit that provides its output to the data collection system 225. According to another alternative, the GPS unit 230 may be part of an in-vehicle navigation system installed in the vehicle 232. According to this latter alternative, the data collection system 225 is coupled to receive the output of the GPS unit from the in-vehicle navigation system.

The data collection system 225 includes data collection program 236. The data collection program 236 includes one or more software programs, routines, or applications. The data collection program 236 is installed on a portable computing device 238, such as a notebook computer, located in the vehicle 232. In one embodiment, the data collection program 236 is written in the C programming language. In alternative embodiments, other programming languages may be used, such as C++, Java, Visual Basic, and so on.

The data collection program 236 includes a GPS engine program 240. The GPS engine program 240 receives the output 234 of the GPS unit 230. The GPS engine program 240 may also receive data from other equipment, such as inertial sensors.

The GPS engine program 240 also receives data 242 that represent some of the geographic features in the area in which the vehicle 232 is traveling. The data 242 are obtained from the master copy 100 of the geographic database. These data 242 had been previously obtained and stored in the master copy 100 of the geographic database. These data 242 may have been obtained by a method other than direct observation by a researcher in the field. For example, the data 242 may have been obtained from examination and processing of aerial photographs. The data 242 acquired by the GPS engine program 240 from the master copy 100 of the geographic database include some of the attributes of the represented geographic features, but not necessarily all the attributes of the represented geographic features. For example, the data 242 acquired by the GPS engine program 240 from the master copy 100 of the geographic database may include data that indicate the geometry of a road. The data that indicate the geometry of a road include the geographic coordinates (i.e., latitude, longitude, and optionally altitude) of points along the road, such as intersections along the road and points along a segment of a road between intersections. The data 242 acquired by the GPS engine program 240 from the master copy 100 of the geographic database may also include the names of roads. However, the data 242 acquired by the GPS engine program 240 from the master copy 100 of the geographic database may not include such data as address ranges along roads, whether a lane divider is present, the lane category, the functional class, the speed category, whether the road is paved, whether the road is multi-digitized, points of interest along the roads, traffic and parking conditions, or signs along the roads. Hence, there is a need for the researcher to travel to an assignment area in the geographic region and observe the geographic features to collect additional attributes.

Using the data 234 from the GPS unit 230 and the data 242 from the master copy 100 of the geographic database, the GPS engine program 240 provides a series of outputs 244. Each output indicates the position and heading of the vehicle 232 and the road segment upon which the vehicle is located as the vehicle 232 is being driven along roads in the assignment area.

The data collection program 236 also includes a profile program 250. The profile program 250 includes a profile formation component 252 and a profile application component 254. The profile formation component 252 receives the outputs 244 of the GPS engine program 240. The profile formation component 252 interfaces with the user interface (such as a keyboard and a display) of the portable computing device 238 upon which the data collection program 236 is installed. The profile formation component 252 provides a means by which the researcher can enter data that define an attribute profile 256 for a geographic feature. The profile formation component 252 also provides a means by which the researcher can confirm the data in an attribute profile that has been defined for a geographic feature. The profile formation component 252 also provides a means by which the attribute profile 252 can be saved.

The profile application component 254 of the profile program 250 receives the output (i.e., the profile 256) of the profile formation component 252. The profile application component 254 also interfaces with the user interface components of the portable computing device 238. The profile application component 254 provides a means by which the researcher can enter data that indicate the attributes of a geographic feature, such as a geographic feature being observed by the researcher. For example, the profile application component 254 may present a plurality of data entry fields on the display of the portable computing device 238. The researcher uses the keyboard and/or the pointing device of the portable computing device 238 to enter data into the data entry fields presented on the display. With respect to those attributes of a geographic feature that correspond to the attributes contained in the profile 256, the profile application component 254 automatically enters the attributes from the attribute profile 256 into the appropriate corresponding data entry fields. The profile application component 254 provides a means by which the researcher can override any of the attributes that were automatically entered from the profile with respect to a geographic feature. The profile application component 254 provides a means by which the data that relate to attributes of a geographic feature can be saved in a temporary data file 258. The temporary data file 258 is stored on the portable computer device 238 or on another suitable data storage medium.

After a researcher has completed an assignment (i.e., traveled along roads in an assignment area 200 in FIG. 3, observed geographic features and used the data collection system 225 in FIG. 4 to save data that represent attributes of the observed geographic features in the temporary data file 258), the researcher uses the data in the temporary data file 258 to update the master copy 100 of the geographic database. A database updating program 260 can be used for this purpose. The database updating program 260 is used to connect to the main computer 116 to apply the updated data from the temporary data file 258 to the master copy 100 of the geographic database.

According to one embodiment, the researcher returns to the field office (118 in FIG. 1) and connects to the main computer 116 via the data network 122. Then, the researcher uses the database updating program 260 to update the master copy of the geographic database 100 using the data contained in the temporary data file 258. According to this alternative, the database updating program 260 may be stored with the data collection program 236 on the portable computing device 238 or alternatively, the database updating program 260 may be stored on a computer at the field office 118. According to another alternative, the researcher may not have to return to a field office, but instead, the researcher can connect to the main computer 116 and the primary copy of the geographic database 100 from a hotel room or other remote location. According to this alternative, the database updating program 260 is stored with the data collection program 236, e.g., on the portable computing device 238. According to yet another alternative, the researcher can establish a wireless communication connection to the main computer 116 and the primary copy of the geographic database 100 while in the assignment area and apply the updates to the master copy of the geographic database 100 from the assignment area. The researcher may use a wireless modem for this purpose.

III. OPERATION OF THE DATA COLLECTION SYSTEM

Figure 5:
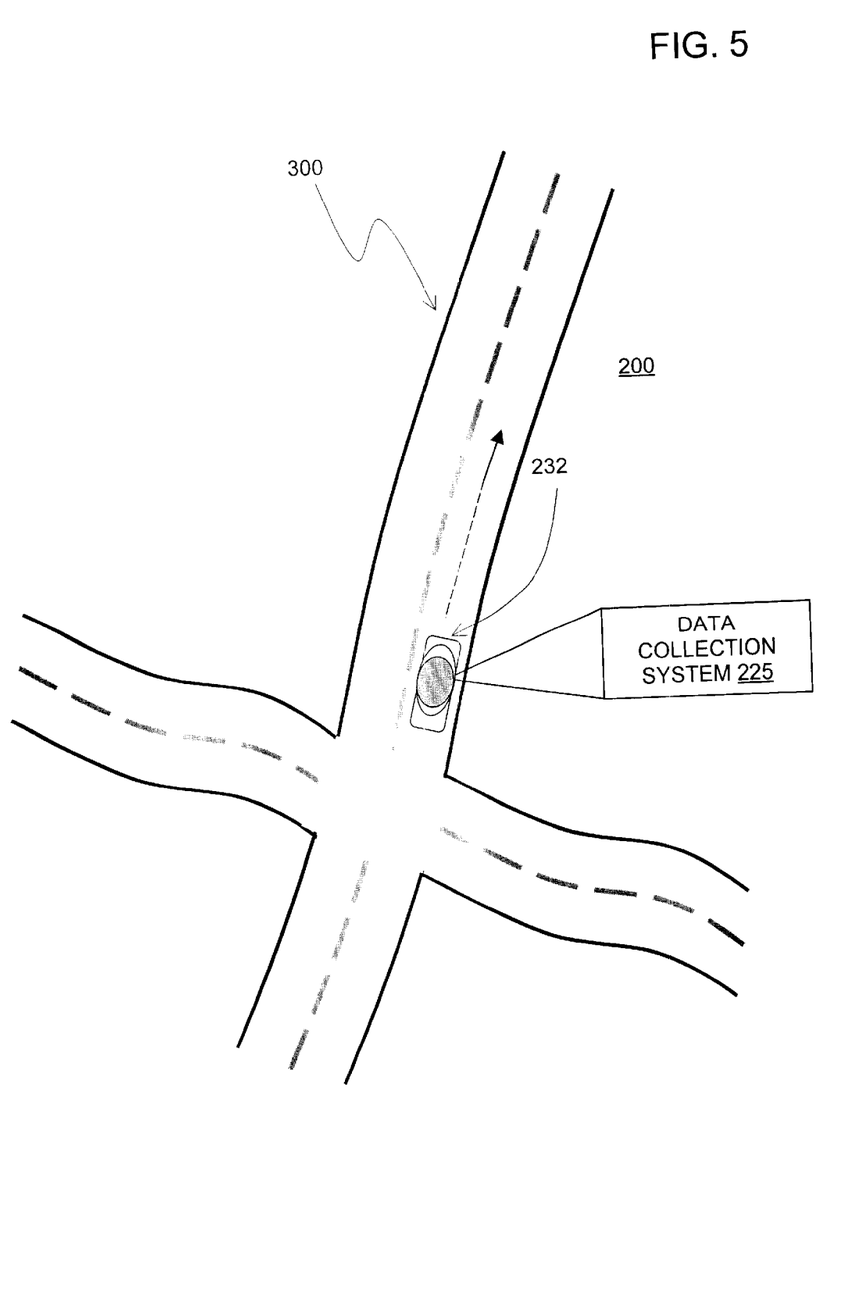
FIG. 5 shows a portion of a road in the assignment area of FIG. 3 and illustrates a use of the system shown in FIG. 4.

Operation of the data collection system 225 is described with reference to FIGS. 4 through 8. Referring to FIG. 5, there is an illustration of a road 300 located in the assignment area 200. The vehicle 232 equipped with the data collection system 255 is traveling along the road 300. The database researcher is also in the vehicle 232. The researcher may be the driver of the vehicle or alternatively, the researcher may be a passenger.

Figure 6:
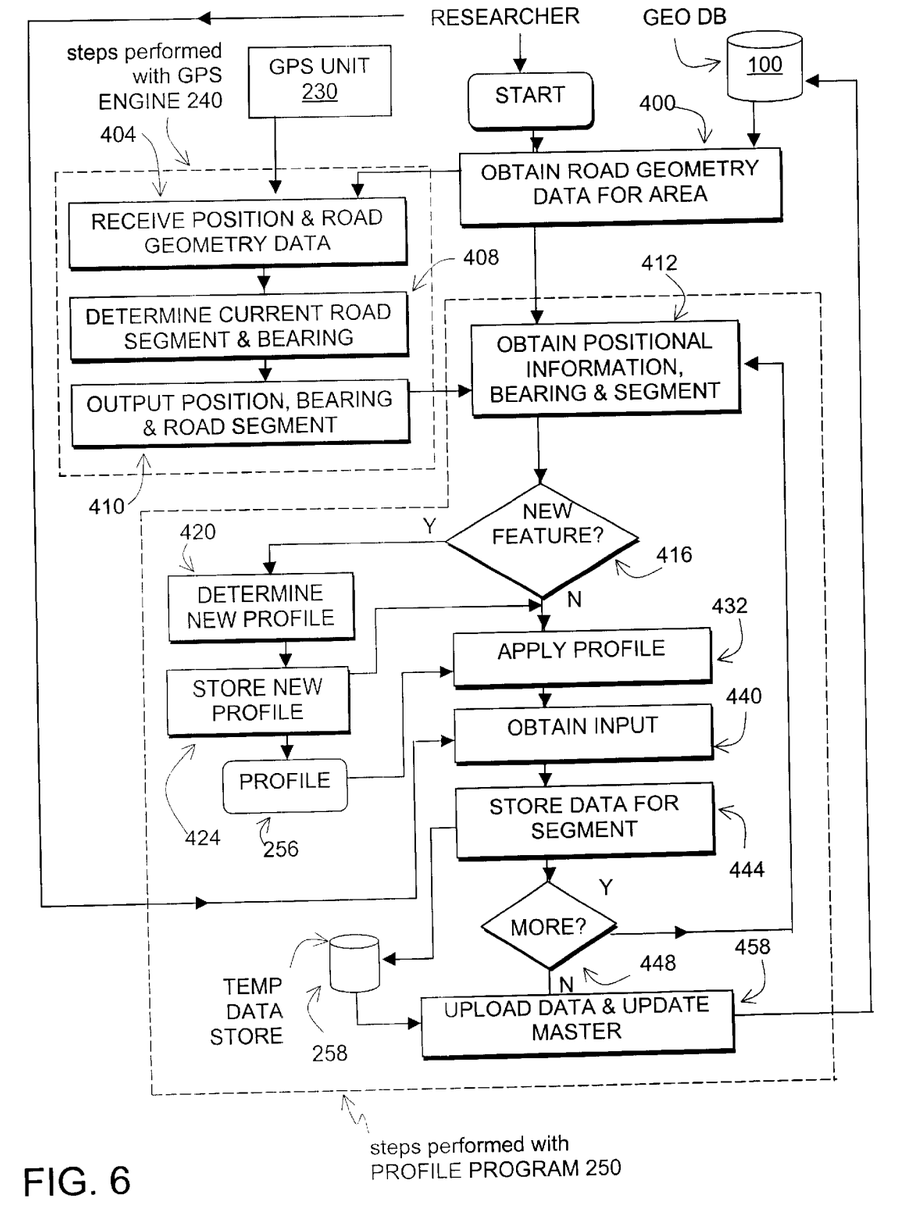
FIG. 6 is a flow chart showing steps performed by the data collection system shown in FIG. 4.

Operation of the profile program 150 is described in conjunction with FIG. 6. Prior to using the data collection system 225 to collect attribute data in the assignment area, the data 242 indicating the road geometry are obtained from the master copy of the geographic database 100 (Step 400). This step may be performed automatically by either the GPS engine program 240 or the profile program 250. Alternatively, this step may be performed by the database researcher. The data 242 may be obtained using a modem or a network connection.

As the vehicle 232 travels along the road 300, the GPS unit 230 determines instantaneous positions of the vehicle 232. The GPS engine program 240 receives the output of the GPS unit 230 (Step 404). The GPS engine program 240 also receives the road geometry data 242 from the master copy of the geographic database 100. The GPS engine program 240 uses the output of the GPS unit 230 and the data from the master copy of the geographic database 100 to determine which road segment the vehicle is on (Step 408). The GPS engine program makes this determination using a map matching technique. Various map matching techniques are known. For example, a map matching technique is disclosed in Ser. No. 09/276,377, the entire disclosure of which is incorporated by reference herein. The GPS engine 240 provides an output that indicates the vehicle position, heading, and the road segment on which the vehicle is located (Step 410).

Figure 7:
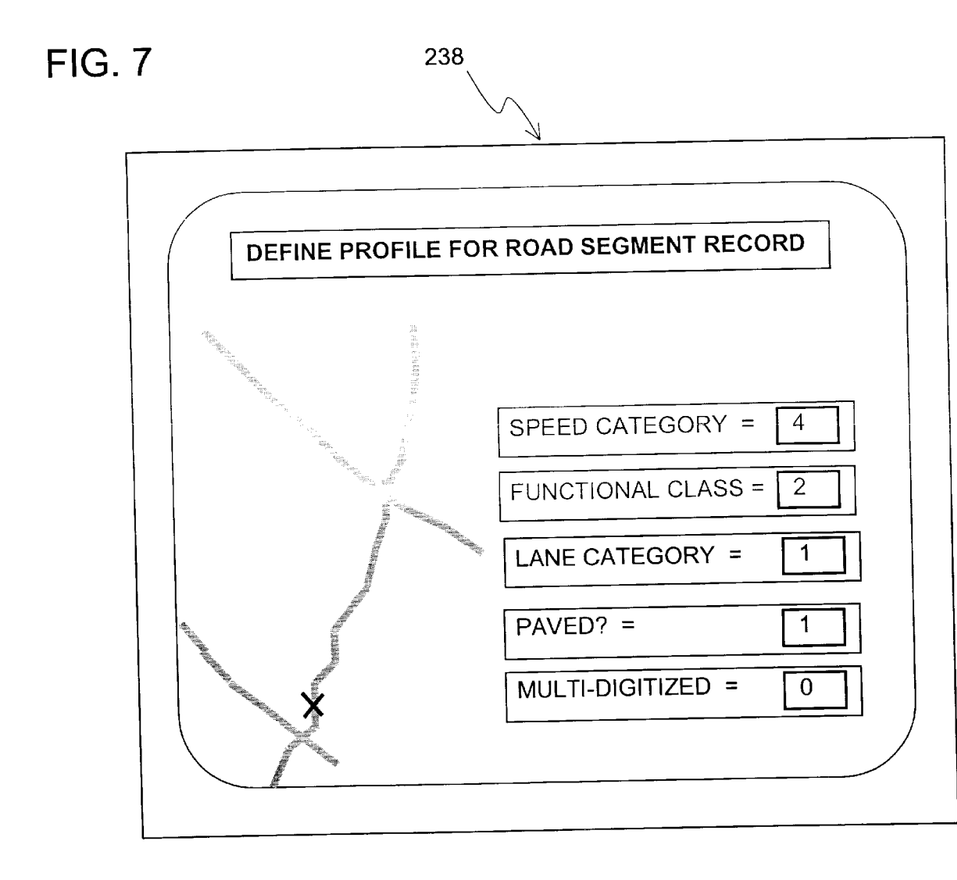
FIG. 7 shows a display of the data collection system of FIG. 4 and on the display are input fields for entering data for defining an attribute profile.

The output of the GPS engine 240 is received by the profile program 250 (Step 412). The profile program 250 determines whether the vehicle is on a new road segment (i.e., feature) and, if it is, whether an attribute profile is available (Step 416). In the case in which the data collection system 225 has just been started, the vehicle 232 is on a new road segment and there is no attribute profile available. Under these circumstances, the profile program 250 presents the researcher with a means to define a profile (Step 420). In this embodiment, the profile program 250 presents the researcher with an input screen that has a plurality of data fields. The data fields on the profile input screen correspond to some of the attributes that the researcher collects with respect to observed geographic features. An example of an input screen is shown in FIG. 7.

Figure 8:
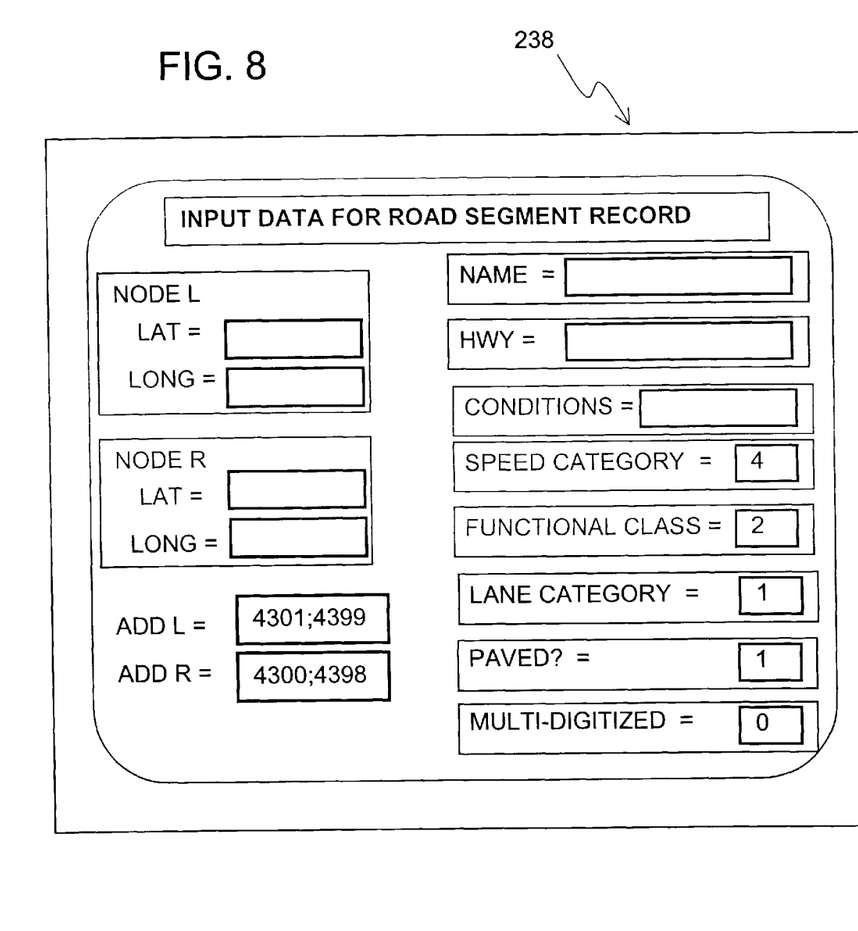
FIG. 8 shows the display of the data collection system of FIG. 4 and on the display are input fields for entering data relating to an observed geographic feature.

After the researcher has used the input screen to define a new profile, the profile program 250 stores the data that had been input by the researcher as a new profile (Step 424). The profile program 250 then presents the researcher with one or more feature attribute input screens. These feature attribute input screens include input fields for all the attributes of an observed geographic feature about which the researcher can store data. An example of one of these feature attribute input screens is shown in FIG. 8. With respect to those fields on the feature attribute input screen that correspond to the data contained in the attribute profile, the profile program 250 automatically fills in the fields on the feature attribute input screen with the corresponding data attributes from the attribute profile (Step 432).

When presented with the feature attribute input screens, the researcher can enter data into any of the data fields. With respect to those data fields that have already been filled in with data from the attribute profile, the researcher may override the data from the attribute profile with different data. With respect to those data fields that were not filled in with data from the attribute profile, the researcher can make the appropriate data entries based upon his/her observation of the geographic feature (Step 440). Not all the data fields on the feature attribute input screen have to be filled in. The profile program 250 then includes the data from the feature attribute input screens in a data record that represents the observed geographic feature. This data record is then stored in a temporary data file 258 (Step 444). The process continues by looping back to the Step 412 in which data indicating the position, heading and road segment upon which the vehicle is located are received from the GPS engine program 240 (Step 448).

Meanwhile, the GPS engine program 240 continues to receive new position data from the GPS unit (Step 404, again) and continues to provide outputs that indicate the vehicle position, heading and road segment upon which the vehicle 232 is located (408, again). The profile program 250 receives the data which are output from the GPS engine program 240 (Step 412, again) and examines the data to determine whether the vehicle has traveled onto a new road segment. If the vehicle has traveled onto a new road segment, the profile program 250 determines whether the new segment is part of a different linear feature, i.e., a different road (Step 416, again). The profile program may determine whether the new road segment is part of a different linear feature by comparing the name of the new road segment to the previous road segment (if such information is available) or by examining some other distinguishing characteristic of the road segment data. If the new segment is part of the same linear feature (i.e., is part of the same road) as the prior road segment, the profile program 225 automatically applies the data from the attribute profile 256 that had been used for the prior road segment (Step 432, again). The process continues as before by obtaining the researcher's input (Step 440, again) and then storing the data for the new segment (Step 444, again).

After the researcher has finished obtaining data about observed geographic features, the data contained in the temporary data storage file 258 are used to update the master copy of the geographic database 100 (Step 452). As mentioned above, this step may be performed while the researcher is still out in the assignment area or alternatively, this step may be performed back at the field office.

In order to update the master copy of the geographic database, the researcher may use a database updating program. Embodiments of suitable database updating programs are described in the copending patent application entitled "METHOD AND SYSTEM FOR COLLECTING DATA FOR UPDATING A GEOGRAPHIC DATABASE," Ser. No. 09/256,389, filed Feb. 24, 1999, and the copending patent application entitled "METHOD AND SYSTEM USING VOICE COMMANDS FOR COLLECTING DATA FOR A GEOGRAPHIC DATABASE," Ser. No. 09/335,122, filed Jun. 16, 1999, the entire disclosures of which are incorporated by reference herein.

EXAMPLE 1

If a researcher is working in a city in downstate Illinois, he/she may set up the following profiles:
  Illinois Interstate: Speed Limit 65. Function Class 1.
    Controlled Access 'Y'.
    Paved 'Y'....
  Illinois State Hwy: Speed Limit 55. Function Class 2.
    Controlled Access 'N'.
    Paved 'Y'....
  County Highway: Speed Limit 45. Function Class 3.
    Controlled Access 'N'.
    Paved 'Y'....

City Collectors: Speed Limit 35. Function Class 4. Controlled Access 'N'. Paved 'Y'. . . .

City Streets: Speed Limit 20. Function Class 5. Controlled Access 'N'. Paved 'Y'. . . .

One Way Street: Direction of Travel (based on bearing). Divider 'N'. . . .

EXAMPLE 2

If a researcher is working in the city of Chicago, he/she may set up the following profiles based on bearing of the vehicle.

City Street Types: Bearing North/South→Street Type 'Ave'. . . .

Bearing East/West→Street Type 'St'. . . .

V. ADVANTAGES

The dynamic profiling feature of the data collection system derives from the recognition that road attributes tend to be location-consistent. When a database researcher is collecting data in a particular administrative area (e.g., municipality, town, city, etc.), it is highly desirable to eliminate repeated entry of the same data elements. Given the "knowledge" gained from the sensors on the car coupled with a dynamic profiling tool, most of this work can be eliminated.

The data collection system with the dynamic profiling feature allows a database researcher to describe profiles based upon a current drive scenario. The database researcher spends some time up front to describe the "normal" attribute coding in order to eliminate as much work as possible later throughout the assignment project. As the database researcher drives along the roads, he/she describes each road based upon the profiles that had been set up. With this action, the database researcher sets many values by choosing one profile and by leveraging the sensors, along with automatic application of the profile.

VI. FURTHER ALTERNATIVES

The data collection system (225 in FIG. 4) can be used to collect data for geographic features other than roads. For example, the data collection system 225 can be used to collect data relating to points of interest, ponds, lakes, bridges, railroads, ferries, rivers, buildings, etc.

It is intended that the foregoing detailed description be regarded as illustrative rather than limiting and that it is understood that the following claims including all equivalents are intended to define the scope of the invention.

We claim:

1. In combination:

a profile formation program that presents a user with a first set of input fields that allows the user to define an attribute profile of a geographic feature; and a profile application program that presents the user with a second set of input fields that allows the user to enter data relating to the attributes of an observed geographic feature, wherein said profile application program fills in those input fields of said second set with corresponding data from said attribute profile, and wherein said profile application program allows data contained in said input fields of said second set to be saved and used to update a primary copy of a geographic database.

2. The invention of claim 1 wherein said profile formation program and said profile application program are located in a vehicle that travels along roads in a geographic area.

3. The invention of claim 2 further comprising:

a GPS unit that determines a geographic position and that provides an output indicative thereof, wherein said GPS unit is located in said vehicle.

4. The invention of claim 3 further comprising:

a GPS engine program that uses the output of the GPS unit and data that indicate road geometry to determine on which road segment the vehicle is located and provide an output indicative thereof to said profile application program, wherein the data relating to the attributes of an observed geographic feature pertain to the road segment on which the vehicle is located.

5. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment; and storing data about each road segment being traversed including the attributes in said profile, wherein said attributes include an exact speed limit.

6. The method of claim 5 wherein said attributes include a speed category.

7. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment;

storing data about each road segment being traversed including the attributes in said profile, and as each new road segment is encountered, determining whether the new road segment is part of the same feature as the previous road segment and then, if it is, presenting a user with said profile used for the previous road segment.

8. The method of claim 7 wherein said attributes include a functional class.

9. The method of claim 7 wherein said attributes include a lane category.

10. The method of claim 7 wherein said step of determining positions is performed with a GPS receiver.

11. The method of claim 7 wherein any of said attributes can be overridden when said data about each road segment are being stored.

12. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment; and storing data about each road segment being traversed including the attributes in said profile, wherein said attributes include an indication of the exact number of lanes.

13. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment; and storing data about each road segment being traversed including the attributes in said profile, wherein said attributes indicate whether a represented road segment is unpaved.

14. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment; and storing data about each road segment being traversed including the attributes in said profile, wherein said attributes include an indication whether a represented road segment is multi-digitized.

15. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment;

storing data about each road segment being traversed including the attributes in said profile, and entering addresses associated with positions along a road segment as said road segment is being traversed.

16. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment;

storing data about each road segment being traversed including the attributes in said profile, and displaying a plurality of input fields on a computer display screen, wherein said plurality of input fields correspond to the plurality of attributes included in the specification of said profile.

17. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment;

storing data about each road segment being traversed including the attributes in said profile, and as each new road segment is encountered, determining whether the new road segment is part of the same feature as the previous road segment and then, if it is not, presenting a user with input fields for defining a new profile.

18. A method of collecting data for a geographic database comprising the steps of:

traversing road segments while travelling through a geographic region in a vehicle;

determining positions while travelling;

with a data collection program run on a computing apparatus located in the vehicle, defining a profile of a road segment, wherein said profile includes a specification of a plurality of attributes of the road segment;

storing data about each road segment being traversed including the attributes in said profile, uploading the data stored about each road segment; and updating a master copy of a geographic database using said uploaded data.

19. A data collection system comprising:

a profile program executed on a computing platform, wherein said profile program includes:

a formation component that allows a user to define and store a profile, wherein said profile is comprised of one or more attributes of a geographic feature; and an application component that automatically fills in data entry fields in a feature attribute input screen with the attributes from said profile.

20. The invention of claim 19 wherein said geographic feature comprises a road segment.

21. The invention of claim 19 further comprising:

a GPS engine that identifies to said application component which geographic feature said data entry fields in said feature attribute screen pertain to.

* * * * *